United States Patent
Arns

(10) Patent No.: US 10,023,140 B2
(45) Date of Patent: Jul. 17, 2018

(54) BUMPER ASSEMBLY WITH CLOSING PLATE

(71) Applicant: BENTELER Automobiltechnik GmbH, Paderborn (DE)

(72) Inventor: Wilhelm Arns, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 33 days.

(21) Appl. No.: 15/217,184

(22) Filed: Jul. 22, 2016

(65) Prior Publication Data

US 2017/0021788 A1    Jan. 26, 2017

(30) Foreign Application Priority Data

Jul. 23, 2015    (DE) .................... 10 2015 111 995

(51) Int. Cl.
| | |
|---|---|
| B60R 19/03 | (2006.01) |
| B60R 19/02 | (2006.01) |
| B60R 19/18 | (2006.01) |
| B60R 21/34 | (2011.01) |

(52) U.S. Cl.
CPC ............ B60R 19/023 (2013.01); B60R 19/18 (2013.01); B60R 21/34 (2013.01); B60R 2019/186 (2013.01); B60R 2019/1813 (2013.01); B60R 2019/1873 (2013.01); B60R 2021/343 (2013.01)

(58) Field of Classification Search
CPC ....... B60R 19/023; B60R 19/18; B60R 21/34; B60R 2019/1813; B60R 2019/186; B60R 2019/1873; B60R 2021/343
See application file for complete search history.

(56) References Cited

U.S. PATENT DOCUMENTS

| | | | |
|---|---|---|---|
| 7,399,013 B2* | 7/2008 | Lutke-Bexten | ......... B60R 19/18 |
| | | | 293/102 |
| 2004/0256867 A1 | 12/2004 | Evans et al. | |
| 2014/0203576 A1* | 7/2014 | Handing | ................. B60R 19/18 |
| | | | 293/102 |

(Continued)

FOREIGN PATENT DOCUMENTS

| | | |
|---|---|---|
| DE | 602004006327 | 1/2008 |
| DE | 102010050013 | 5/2012 |
| DE | 102013111189 | 4/2015 |

(Continued)

*Primary Examiner* — Lori L Lyjak

(74) *Attorney, Agent, or Firm* — Jacobson Holman, PLLC.

(57) ABSTRACT

A bumper assembly for a motor vehicle comprising a cross member that extends transverse the motor vehicle, and has an open hat-shaped hollow profile with a rear-sided web and legs, extending from the web, wherein flanges extend from a free end of the legs in the vertical direction; and an opening pointing away from the motor vehicle, in the longitudinal direction. At least one closing plate is arranged allowing the opening to be completely closed in the vertical direction and arranged allowing a partial length of less than 50% of the length of the opening to be closed in the transverse direction; and that the flanges are offset from each other with an offset in the longitudinal direction; and that the cross member has a varying cross section over its length, wherein a central region is offset upwards from the end regions with a height offset to the vertical direction.

16 Claims, 5 Drawing Sheets

(56) References Cited

U.S. PATENT DOCUMENTS

2015/0102614 A1* 4/2015 Arns .................... B60R 19/023
                                                              293/102

FOREIGN PATENT DOCUMENTS

| EP | 1199224 A1 * | 4/2002 | ............. B60R 19/18 |
| WO | WO-2008117896 A1 * | 10/2008 | ............. B60R 19/18 |
| WO | WO 2009/092406 | 7/2009 | |
| WO | WO 2014/142733 | 9/2014 | |
| WO | WO-2015133949 A1 * | 9/2015 | ........... B60R 19/023 |

* cited by examiner

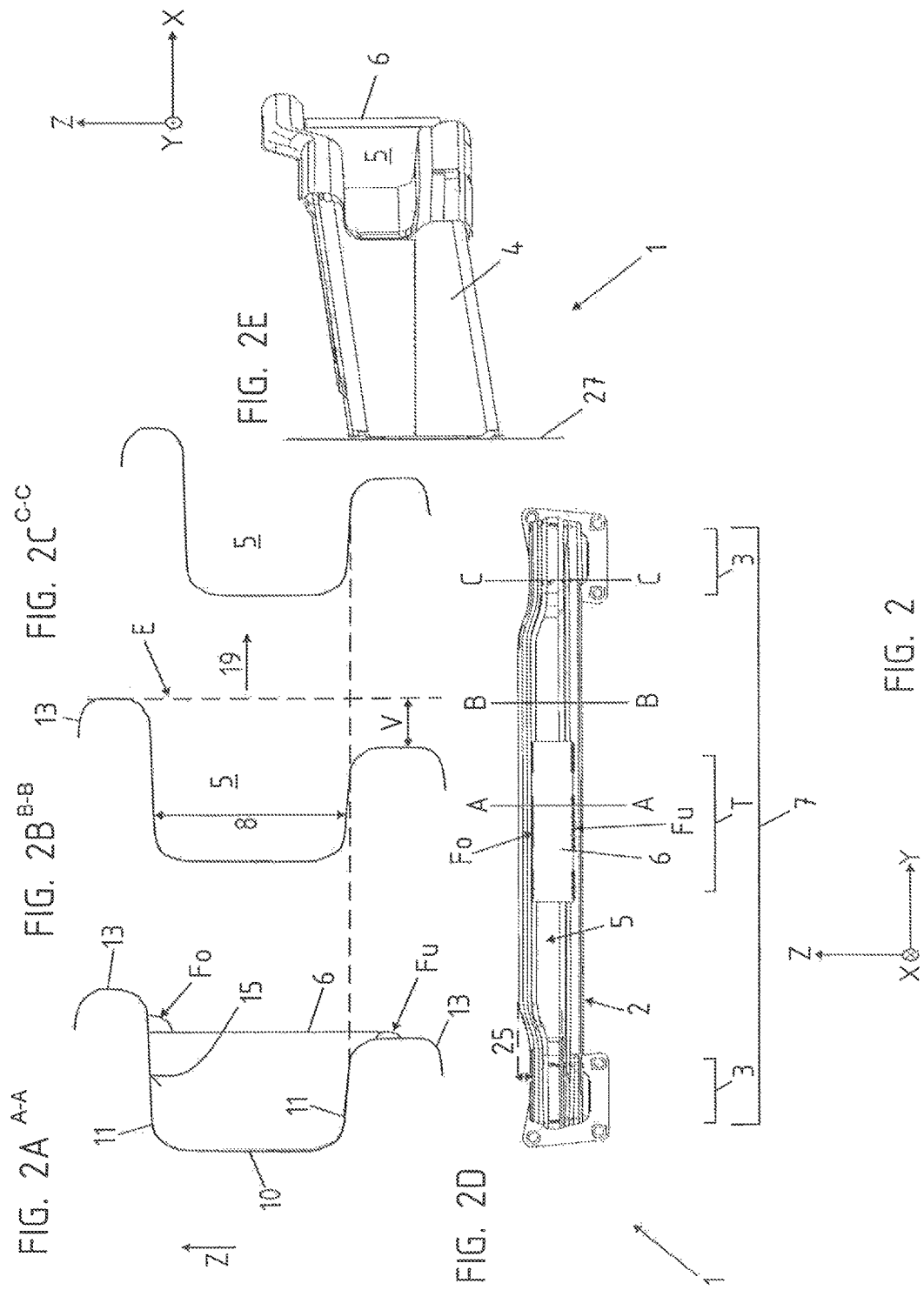

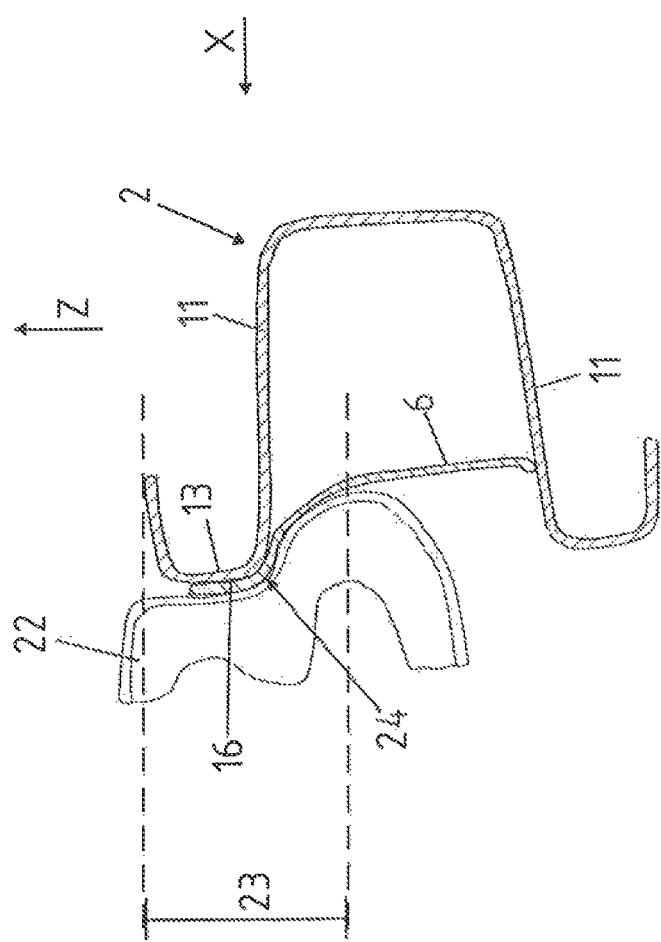
FIG. 3A
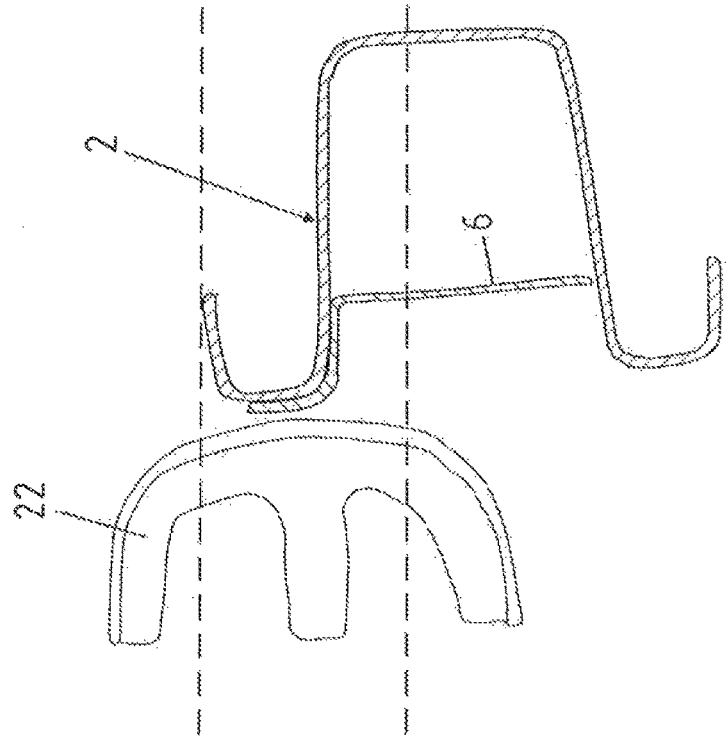
FIG. 3B
FIG. 3

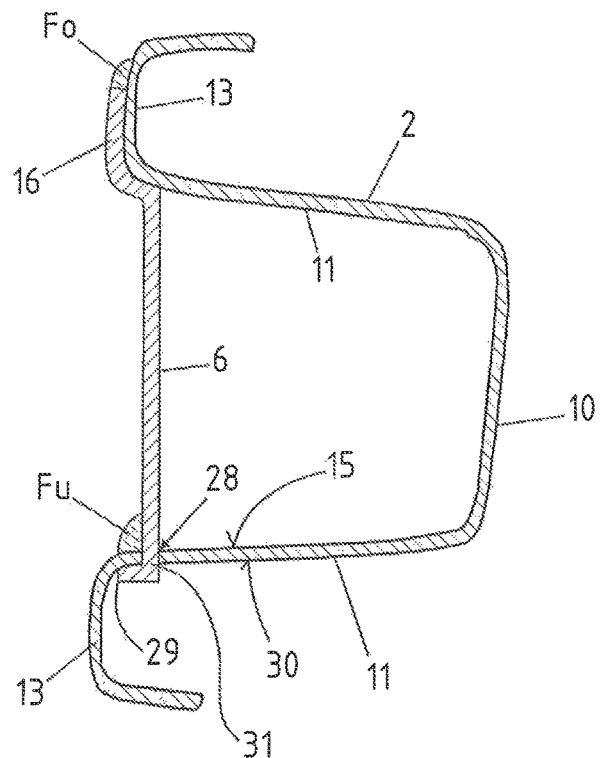
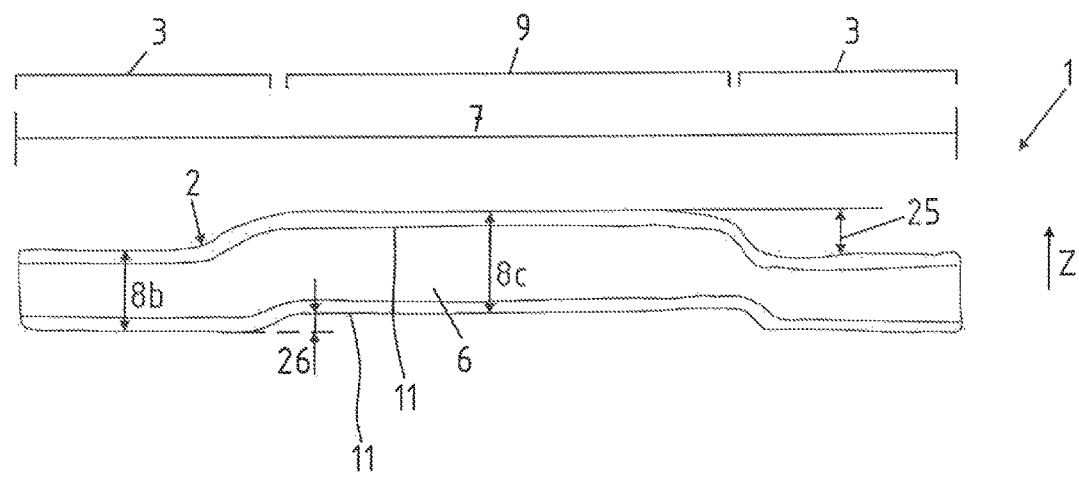

BUMPER ASSEMBLY WITH CLOSING PLATE

FIELD OF THE INVENTION

The present invention relates to a bumper assembly for a motor vehicle, said bumper assembly comprising a cross member that extends with a length in the transverse direction Y of the motor vehicle, wherein the cross member is configured in the cross section as an open hat-shaped hollow profile with a rear-sided web and legs, extending from the web, wherein flanges extend from a free end of the legs in the vertical direction Z of the motor vehicle; and an opening is oriented, pointing away from the motor vehicle, in the longitudinal direction X of the motor vehicle.

PRIOR ART

From the prior art it is known to mount a bumper assembly on both the front and the rear of a motor vehicle. Said bumper assembly typically comprises a cross member that extends in the transverse direction of the motor vehicle, where in this case the cross member covers, in particular, approximately the width of the motor vehicle. The cross member is coupled to the motor vehicle. This coupling is carried out, in particular, by incorporating crash boxes. The crash boxes in turn extend in the longitudinal direction of the motor vehicle and deform on impact, in order to convert the impact energy into deformation.

The cross member is supposed to be designed as flexurally rigid as possible, in order to absorb an impacting solid wood pole or the like, so that said solid wood pole cannot penetrate into the interior of the vehicle, for example, that it moves the engine block into the passenger compartment.

At the same time the cross member in turn has to have such a height that it exhibits the necessary overlap for crash scenarios in the event of a bumper to bumper crash, in the event of a collision with another vehicle.

In addition, the demands on the entire bumper assembly are specified in such a way that it has to be produced extremely cost effectively. It should It should have a low intrinsic weight and allow sufficient degree of freedom for the exterior design of the motor vehicle, yet exhibit all of the crash properties that are required by law and the manufacturer.

Such a cross member is known, for example, from the patent WO 2014/142733 A1.

Moreover, there exist not only scenarios involving a collision and impacting with obstacles with overlap or with other motor vehicles as crash scenarios, but there also exist "soft" collisions with a pedestrian. As a result, a bumper assembly should also fulfill the requirement of providing pedestrian protection.

BRIEF SUMMARY OF THE INVENTION

The object of the present invention is to provide a bumper assembly for a motor vehicle that can be produced in a simple and cost effective way, has a low intrinsic weight and satisfies not only crash tests with a lateral overlap but also bumper to bumper crash tests and optionally meets pedestrian protection criteria at the same time.

The aforementioned object is achieved with a bumper assembly for a motor vehicle said bumper assembly comprising a cross member that extends with a length in the transverse direction Y of the motor vehicle, wherein the cross member is configured in the cross section as an open hat-shaped hollow profile with a rear-sided web and legs, extending from the web, wherein flange extend from a free end of the legs in the vertical direction Z of the motor vehicle; and an opening is oriented, pointing away from the motor vehicle, in the longitudinal direction X of the motor vehicle.

Advantageous design variants are described in the dependent claims.

The bumper assembly for a motor vehicle has a cross member that extends lengthwise in the transverse direction of the motor vehicle. In this case the length of the cross member is equal in essence to the width of the motor vehicle. The cross member itself is configured in cross section as an open hat-shaped hollow profile with a rear-sided web and legs, extending from the web, where in this case a flange extends from a free end of each leg in the vertical direction of the motor vehicle. This means that, in the case of four sides; at the top, bottom, rear, front, one of these sides is open. The open hollow profile can also be referred to as semi-open. The resulting opening is oriented in the longitudinal direction of the motor vehicle in such a way that said opening points away from the motor vehicle. This means that for a bumper assembly that is mounted on the front of the motor vehicle, the opening points toward the front in the direction of travel, which is the forward direction of travel. In the case of a bumper assembly that is mounted on the rear, the opening points correspondingly towards the rear in the rearward direction of travel. According to the invention, it is now provided that at least one closing plate is arranged in a manner allowing the opening to be completely closed in the vertical direction of the motor vehicle and is arranged in a manner allowing a partial length of the opening to be closed in the transverse direction of the motor vehicle. In this context the partial length is equal to less than 50% of the length of the cross member.

The closing plate is designed in a manner allowing, in particular, a partial length of less than 40%, in particular, less than 30%, preferably less than 25%, specifically, at least 1% and even more, preferably 5% to 20% of the length of the opening of the cross member to be closed in relation to the transverse direction of the motor vehicle. As a result, the bumper assembly of the invention has a low intrinsic weight and low production costs due to the small amount of material that is used compared to other bumper assemblies known from the prior art that have a complete closing plate made of sheet metal. At the same time, however, the closing plate, in particular, in the form of the tension rod strip, prevents the open hollow profile from expanding not only in the event of a bumper to bumper crash, but also upon crashing into a post or any other obstacle, so that the result is an enhanced crash performance.

The flexural resistance of the cross member is ensured due to the feature that the cross section is formed in the shape of a hat. This means that, based on the respective installation situation, a web, which is oriented in the vertical direction of the motor vehicle, is arranged on the rear side. Legs, which are oriented in the longitudinal direction of the motor vehicle, extend from the web.

Furthermore, it is preferred that flanges, which project in such a way that they are oriented in the vertical direction of the motor vehicle, are formed on the end points of the legs. As a result, in the normal case the cross member of the invention has a high overlap in a bumper to bumper crash in relation to the vertical direction of the motor vehicle owing to the flanges. Since the legs are oriented in the longitudinal direction of the motor vehicle, the result is sufficient flexural resistance.

At the same time the bumper assembly of the invention is made of a metallic material. In this case it is even more highly preferred that a steel alloy be used. This steel alloy offers the advantage that it can be thermally joined in a simple and cost effective way, in particular, by means of a welding process. In particular, a steel alloy, which can be heat treated, is used; or a high strength, preferably ultra high strength steel alloy is used. It is also particularly preferred that the closing plate be made of a steel alloy that is easy to join to the cross member. Furthermore, the cross member, which is described according to the invention, lends itself to being attached to crash boxes, where in this case the crash boxes in turn are mounted on the motor vehicle, in particular, in the end region of the longitudinal member.

The cross member exhibits over its length a cross sectional geometry that diverges from each other. In particular, the height of the cross member in the central region is greater than in the end regions. This feature fulfills the requirement of a bumper to bumper crash with respect to an adequate vertical overlap. For this purpose the cross member is designed, in particular, in such a way that, in order to increase the height, the leg, which is located at the top on the motor vehicle in the installation position, is offset upwards in relation to the vertical direction of the motor vehicle. The bottom leg is arranged preferably in such a way that it stays the same. It is also possible for the bottom leg to be offset upwards at the same time or for the bottom leg to be offset downwards in relation to the vertical direction of the motor vehicle.

Furthermore, it is now provided according to the invention that the flanges, which are arranged in the end region of the legs, have an offset relative to each other in the longitudinal direction of the motor vehicle, For this purpose a plane, on the basis of which the offset is dimensioned, is oriented in the vertical direction of the motor vehicle and the transverse direction of the motor vehicle.

The closing plate can be arranged parallel to the web in relation to the vertical direction of the motor vehicle, but can also be arranged at an angle. In particular, the closing plate can be arranged at an angle to the rear-sided web. However, the closing plate can also be arranged parallel to the web.

For coupling purposes the preferred embodiment of the invention is thermally joined to an inner face in a manner allowing butt contact with a leg. The thermal joining can be carried out preferably by mean of a longitudinal seam welding process.

The closing plate can be butt-joined to both legs or can also be joined to a flange.

The closing plate has an additional coupling flange at the top and/or bottom preferably on at least one side, thus, in relation to the vertical direction of the motor vehicle. The coupling flange rests at least partially against the leg and/or the flange in such a way that said coupling flange forms a double layer with said leg and/or flange.

Consequently the cross section of an upper or bottom portion of the closing plate has a cross sectional contour that is at least partially S shaped or Z shaped.

In another preferred embodiment of the invention the closing plate is additionally coupled to the cross member in a positive locking manner. For example, the cross member has a slot, which extends in the transverse direction of the motor vehicle, where in this case the slot is penetrated by a lug of the closing plate. The lug of the closing plate can be configured to point away in a manner allowing orientation in one direction, but the lug can also be configured, for example, to be L or Z shaped in the cross section, so that said lug is anchored in the slot of the cross member. This arrangement facilitates the initial assembly in terms of the positioning. At the same time the additional positive locking engagement makes possible a smaller amount of force to he absorbed by the thermal joining weld.

Furthermore, in order to fulfill the requirements of providing pedestrian protection, it is provided that a pedestrian protection element be arranged in the opening of the cross member. The pedestrian protection element is designed, in particular, as a foam block.

In order to satisfy the requirements of a protection system for a "soft" collision with a pedestrian, it is provided that the pedestrian protection element juts out from the cross member in the longitudinal direction of the motor vehicle. In particular, the pedestrian protection element protrudes 1 mm to 100 mm, preferably 5 mm to 50 mm, in the longitudinal direction of the motor vehicle. In particular, the pedestrian protection element projects from the legs and/or the flanges by the aforementioned amount.

Owing to the at least one closing plate, which is arranged according to the invention and which covers only a portion of the length of the cross member, it is particularly preferred that the pedestrian protection element be disposed in the remaining length. Hence, the pedestrian protection element is arranged in the longitudinal sections, in which there is no closing plate. This arrangement makes the assembly easier and, in so doing, lowers the cost of production.

Preferably a one-part pedestrian protection element is arranged over the major portion of the length of the opening. In particular, the pedestrian protection element extends over more than 80% of the length of the opening, in particular, more than 85%, preferably more than 90% and even more preferably more than 95% of the opening. In a preferred embodiment of the invention the pedestrian protection element can also be configured to project laterally beyond the cross member, in order to make sure that in the event of a rear end collision with a pedestrian there is a sufficient pedestrian protection effect.

Furthermore, in particular, it is conceivable that a foam block strip is inserted into the opening and that then the closing plate is coupled to the cross member. In this ease the longitudinal section of the pedestrian protection element that is located behind the closing plate is pressed in or, more specifically, deformed and is held in this state by fixing the position of the closing plate.

In another preferred embodiment of the invention it is conceivable that the closing plate is arranged in such a manner that it extends through the pedestrian protection element. In this case the pedestrian protection element has, in particular, a slot, which extends in such a way that it is oriented in the vertical direction of the motor vehicle, whereby the closing plate, penetrating the slot, is coupled to the cross member. In this case it is also preferred that there be in front of the closing plate in relation to the longitudinal direction of the motor vehicle at least one residual protection function for an impacting pedestrian owing to the material of the foam block that is located in front of the slot.

Due to the closing plate the flexural resistance and the torsional rigidity of the cross member are higher than that of an exclusively open cross member without a sheet metal closing plate. In contrast, a complete sheet metal closing plate requires more material, for which reason the production costs and also the total weight will increase, a feature that is avoided by the invention. Furthermore, the coupling of the whole sheet metal closing plate exhibits a longer welding seam and/or more welding spots than the closing plate of the invention.

Another advantage of the invention is that in the event of a collision the closing plate is pressed into the opening of the cross member, as a result of which the legs of the cross member are prevented from spreading apart. Furthermore, when the closing plate is pressed in, the length of the closing plate is reduced in relation to the vertical direction of the motor vehicle, so that the effect of preventing the cross member from opening is reinforced even more. This advantage becomes apparent, in particular, in a bumper to bumper crash with small vertical overlap.

BRIEF DESCRIPTION OF THE DRAWINGS

Other aspects and advantages of the present invention are the subject matter of the following description. Preferred design variants are shown in the schematic figures, which serve to make the invention easy to understand. The drawings show in:

FIG. 2 contains FIGS. 2A to E showing the inventive bumper assembly in variety of views.

FIG. 3 contains FIGS. 3A and B showing a bumper assembly in a cross sectional view in a bumper to bumper crash.

FIG. 4 shows a preferred design variant of the bumper assembly in a cross sectional view.

FIG. 5 shows an alternative design variant of the inventive cross member in a front view.

DETAILED DESCRIPTION OF THE INVENTION

Figure 1:
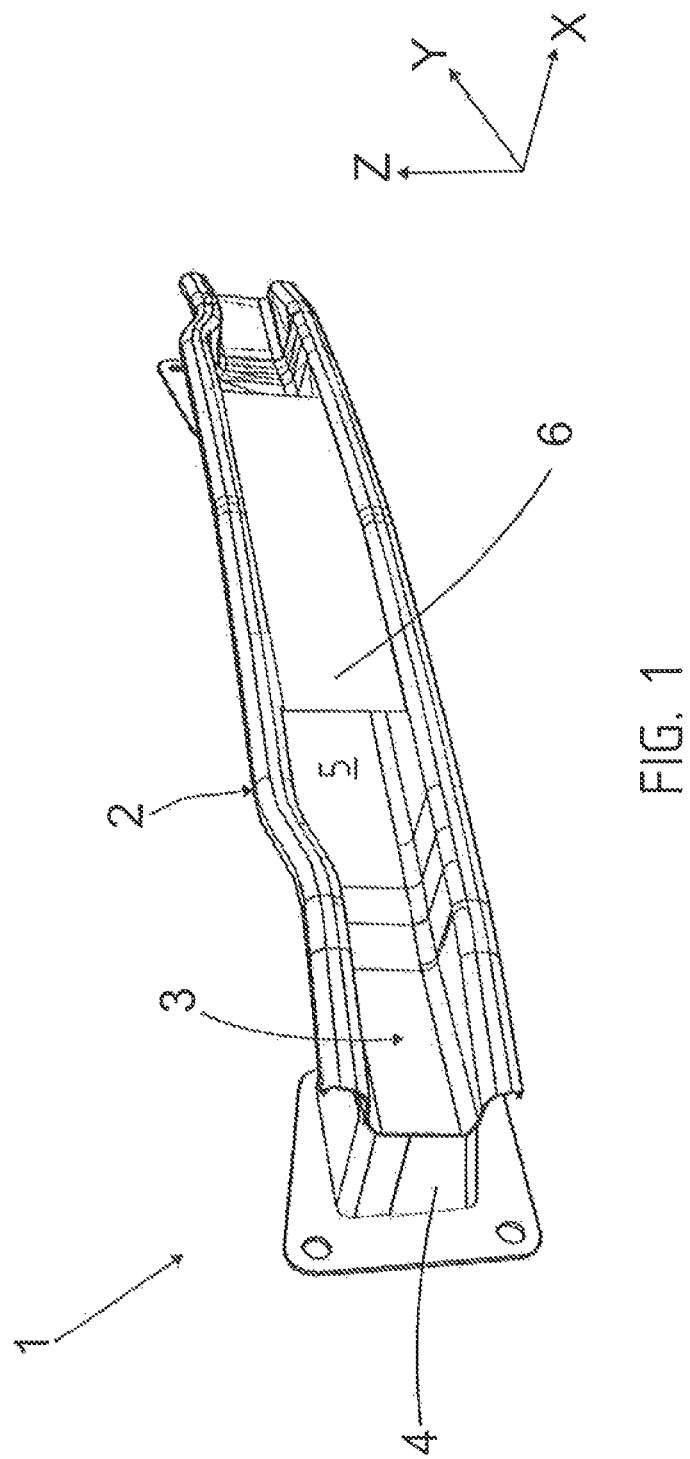
FIG. 1 shows an inventive bumper assembly in perspective view.

The same reference numerals are used for identical or similar components in the figures, even if a repetition of the description is omitted for reasons relating to simplification.

FIG. 1 shows a bumper assembly 1 according to the invention. A cross member 2 is arranged in such a way that it extends in the transverse direction Y of the motor vehicle. The crash boxes 4 are arranged in the end regions 3 of the cross member 2. The cross section of the cross member 2 has a hat-shaped profile, which will be explained in greater detail below in the FIGS. 2A to E. It is provided according to the invention that an opening 5 of the cross member 2 is oriented so as to point in the longitudinal direction X of the motor vehicle and that a closing plate 6 is arranged in the opening 5. The closing plate 6 completely closes the opening 5 in relation to the vertical direction Z of the motor vehicle; and the closing plate 6 closes only a portion of the opening 5 in relation to the transverse direction Y of the motor vehicle.

FIG. 2D shows a front view of the bumper assembly 1 according to the invention. In this case the cross member 2 extends over a major portion of the width of the motor vehicle, which is not shown in detail. Directed towards the front in relation to the direction of travel 19, the cross member 2 leaves an opening 5. Here a closing plate 6 is arranged only in the central section. In this case the closing plate 6 is coupled to a longitudinal weld seam at an upper joining point Fo and to the cross member 2, shown in the cross sectional view in FIG. 2A, and at a bottom joining point Fu. At the upper joining point Fo the closing plate 6 is coupled at an inner face 15 of the upper leg 11 or, more specifically, at a transition from the leg 11 to the flange 13.

The flange 13, which is located at the bottom in relation to the vertical direction Z of the motor vehicle, is recessed with an offset V, as shown in FIGS. 2A, 2B 2C, from the upper flange 13 in relation to the direction of travel 19. What is to be understood here is a front face of the flange 13, which lies in the plane E that extends in the transverse direction Y of the motor vehicle and the vertical direction Z of the motor vehicle. As a result, the closing plate 6 comes to rest, as can be seen in FIG. 2A, against the front face of the bottom flange 13, and is coupled here to said flange at a bottom joining point Fu.

The closing plate 6 is arranged in such a way that it overlaps the central section, so that a partial length T corresponds to less than 50%, preferably less than 40%, in particular, less than 30%, preferably less than 25%, but, in particular, at least 1% and even more preferably 5% to 20% of the length 7 of the opening 5 of the cross member 2. Furthermore, according to FIG. 2E, the cross member is coupled to crash boxes 4. The crash boxes 4 may be secured by means of mounting plates 27 to longitudinal members, which are not shown in more detail. Furthermore, it is shown according to the intersecting lines in FIGS. 2A to 2C that the bottom leg 11 is arranged on a level relative to the vertical direction Z of the motor vehicle, so that the upper leg 11 is designed to be lower towards the respective end regions 3 in relation to the vertical direction Z of the motor vehicle. Hence, the cross sectional height 8 of the cross member 2 decreases toward the end regions 3. In the central region the upper leg 11 is offset upwards with a height offset 25 in the vertical direction Z of the motor vehicle.

FIGS. 3A and 3B show in schematic form a side view of a bumper to bumper crash with a small vertical overlap. At the same time the drawing shows the bumper 22 of another vehicle that has collided into the inventive cross member 2 of the vehicle of this application in an overlap region 23. In this context FIG. 3A shows the bumper 22 and the cross member 2 before the collision; and FIG. 3B shows the collision. It is easy to see that the upper flange 13 and the upper leg 11 of the cross member 2 are pressed more or less rigidly into the bumper 22 in the longitudinal direction X of the motor vehicle and, as a result, catches in the other bumper 22, in the region of a front corner 24, which is formed, due to the stable double layered structure of the coupling flange 16 and the flange 13 and that in conjunction with the rearward recessed closing plate 6. As a result a shearing off of the cross member 2 and the bumper 22 in relation to the vertical direction Z of the motor vehicle is largely avoided. Furthermore, the closing plate 6, which acts as a tension rod on the vertical direction Z of the motor vehicle, also prevents, the upper and lower leg 11 from being pushed apart or, more specifically, pulled apart.

FIG. 4 shows another preferred embodiment of a cross member 2 with a closing plate 6 in a cross sectional view. It is plain to see that the leg 11 that is located at the bottom in relation to the plane of the drawing has an opening 28, in which the closing plate 6 penetrates the cross member 2 in a positive locking manner with a lug 31. A latching lug 29 of the closing plate 6 comes to rest in a positive locking manner, according to the principle of a barb, against an outer face 30 of the bottom leg 11, In addition, the closing plate 6 can then be coupled to the inner face 15 of the leg 11 and/or the flange 13 at a bottom joining point Fu. On a top side the closing plate 6 in turn is configured to rest with a coupling flange 16 against the flange 13 in such a way that a double layer is formed at least in certain sections, but said closing plate can also make butt contact with an inner face of the leg. In addition, this closing plate in turn can be coupled to the flange 13 or an inner face of the leg 11 at an upper joining point Fo. The opening 28 is formed only over a portion of the length 7 of the cross member 2, so that the opening 28 or the openings 28 are preferably smaller than the width B of the closing plate 6 or the closing plates 6.

FIG. 5 shows an additional embodiment of the bumper assembly 1 according to the invention, where the cross member 2 is shown in a frontal view. In this embodiment the central region 9 of the cross member 2 has a height offset from the end regions 3. In this case both legs 11 are offset upwards in parallel in relation to the vertical direction Z of the motor vehicle, so that the resulting height 8c in the central region 9 and the height 8b in the end region 3 are identical. However, the bottom and the upper legs 11 can be offset upwards in the vertical direction Z of the motor vehicle and can be formed in their distance from each other in such a way that the height 8c of the central region 9 is greater than the height 8b of the end region 3. Furthermore, an upper height offset 25 in relation to the vertical direction Z of the motor vehicle is formed in the upper region, with which the central region 9 is configured to project upwards from the end regions 3. A bottom height offset 26 is depicted in relation to die vertical direction Z of the motor vehicle. The height offset 26 can be smaller than the height offset 25.

Figure 6:
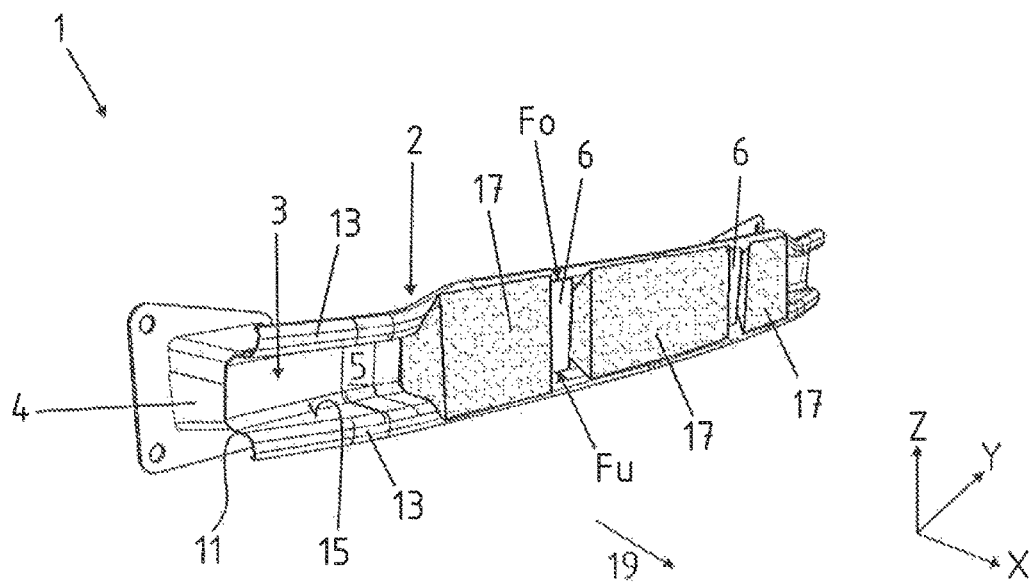
FIG. 6 shows an inventive bumper assembly with a pedestrian protection device.

FIG. 6 shows a design variant that is expanded compared to FIG. 1. In this design variant additional pedestrian protection elements in the form of foam blocks 17 are inserted into the opening 5 and/or are disposed in front of the closing plate 6. In this case the foam blocks 17 are inserted preferably into the opening 5 and project from the flanges 13 towards the front in the direction of travel 19. To this end the design variant according to FIG. 6 provides that the foam blocks 17 expand upwards and downwards towards their free end in relation to the vertical direction Z of the motor vehicle. However, depending on the region of employment it is possible to dispense with the pedestrian protection element in the form of foam blocks 17, if the regional statutory requirements or the insurance related requirements allow it.

Figure 7:
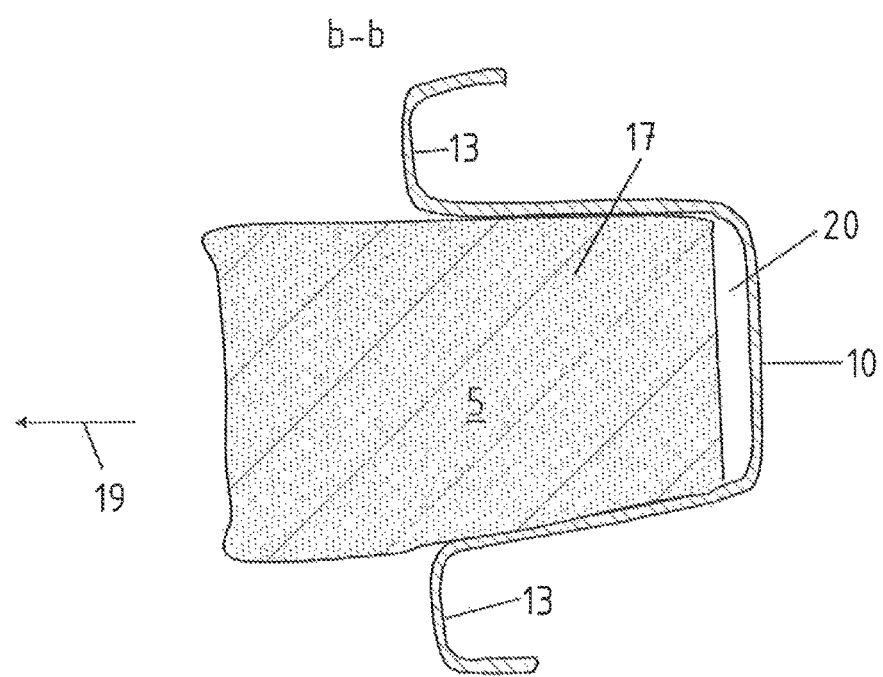
FIG. 7 shows a bumper assembly with a pedestrian protection device in a cross sectional view.

FIG. 7 shows an alternative design variant. Here a bumper assembly 1 is shown, where a pedestrian protection element in the form of a foam block 17 is inserted into the opening. The foam block 17 is inserted into the opening 5 in such a way that it almost comes to rest in a positive locking manner against the web 10, except for a small remaining cavity 20. However, in particular, the foam block 17 protrudes forwards from the flanges 13 in relation to the direction of travel 19 and, as a result, can deform "soft" in the event of a collision with a pedestrian. According to the cross sectional view, the foam block 17 is pushed into the region located between the legs 11 preferably in such a way that said foam block can be easily held in relation to the vertical direction Z of the motor vehicle in a squished or, more specifically, pressed state. However, the foam block 17 can also expand forwards in the direction of travel 19, according to die schematic view, according to the cross sectional view, and, as a result, at least partially overlap the flanges 13, as shown in FIG. 6.

REFERENCE NUMERALS AND SYMBOLS

1—bumper assembly
2—cross member
3—end region with respect to 2
4—crash box
5—opening with respect to 2
6—closing plate
7—length with respect to 2
8a—cross sectional height with respect to 2
8b—cross sectional height
8c—cross sectional height
9—central region
10—web
11—leg
12—end with respect to 11
13—flange
15—inner face with respect to 11
16—coupling flange
17—foam block
18—offset
19—direction of travel
20—cavity
22—bumper
23—overlapping region
24—front corner
25—height offset
26—height offset
27—mounting plate
28—opening
29—latching lug
30—outer face
31—lug
a—distance
B—width with respect to 6
H—height with respect to 6
E—plane
Fo—upper joining point
Fu—bottom joining point
T—partial length
V—offset
X—longitudinal direction of the motor vehicle
Y—transverse direction of the motor vehicle
Z—vertical direction of the motor vehicle

The invention claimed is:

1. A bumper assembly for a motor vehicle, said bumper assembly comprising a cross member that extends with a length in the transverse direction Y of the motor vehicle, herein the cross member is configured in the cross section as an open hat-shaped hollow profile with a rear-sided web and legs, extending from the web, wherein flanges extend from a free end of the legs in the vertical direction Z of the motor vehicle; and an opening is oriented, pointing away from the motor vehicle, in the longitudinal direction X of the motor vehicle, wherein at least one closing plate is arranged in a manner allowing the opening to be completely closed in the vertical direction Z of the motor vehicle and is arranged in a manner allowing a partial length of less than 50% of the length of the opening to be closed in the transverse direction Y of the motor vehicle; and that the flanges are offset from each other with an offset in the longitudinal direction X of the motor vehicle; and that the cross member has a varying cross section over the cross section length, wherein a central region of the cross member is offset upwards from the end regions with a height offset in relation to the vertical direction Z of the motor vehicle; wherein a foam block pedestrian protection element is arranged in the opening of the cross member and no pedestrian protection element is located behind the closing plate.

2. The bumper assembly, as claimed in claim 1, wherein the partial length is less than 5% to 15% of the length of the cross member.

3. The bumper assembly, as claimed in claim 1 wherein the closing plate is coupled to the top side and the bottom side of the cross member in relation to the vertical direction Z of the motor vehicle.

4. The bumper assembly, as claimed in claim 3, wherein the coupling is formed by thermal joining.

5. The bumper assembly, as claimed in claim 3, wherein the closing plate is additionally coupled to the cross member in a positive locking manner.

6. The bumper assembly, as claimed in claim 1 wherein the closing plate is designed as a flat plate, which is butt-coupled to an inner face of the legs or that the closing plate has a coupling flange at least on the top side or the bottom side.

7. The bumper assembly, as claimed in claim 6, wherein the coupling flange abuts, forming with an inner face of the leg a double layer; or that the coupling flange at least partially abuts, forming with the flange a double layer.

8. The bumper assembly, as claimed in claim 1, wherein the closing plate is arranged at an angle to the vertical direction Z of the motor vehicle or to the rear-sided web.

9. The bumper assembly, as claimed in claim 1, wherein the closing plate is recessed with an offset from a plane, defined by the flanges, in relation to the direction of travel.

10. The bumper assembly, as claimed in claim 1, wherein the pedestrian protection element projects from the cross member, in the longitudinal direction X of the motor vehicle.

11. The bumper assembly, as claimed in claim 10, wherein the pedestrian protection element rests against the web with the rear side of the pedestrian protection element.

12. The bumper assembly, as claimed in claim 10, wherein the pedestrian protection element is deformed due to a rear side of the closing plate; or that the pedestrian protection element is penetrated by the closing plate.

13. The bumper assembly, as claimed in claim 1, wherein an opening is present in the cross member, wherein the closing plate has a lug, with which the closing plate engages in the opening in a positive locking manner.

14. The bumper assembly, as claimed in claim 1, wherein the central region is offset upwards with a height offset on the top side and on the bottom side with a height offset from the end regions in relation to the vertical direction Z of the motor vehicle, wherein the central region and the end regions have an identical cross sectional height.

15. The bumper assembly, as claimed in claim 14, wherein the bottom height offset is less than the upper height offset.

16. The bumper assembly, as claimed in claim 1, wherein the central region has a greater cross sectional height than the end regions.

* * * * *